United States Patent
Weyer et al.

[11] 3,835,188
[45] Sept. 10, 1974

[54] BENZENESULFONYL-UREAS AND PROCESS FOR THEIR PREPARATION

[75] Inventors: Rudi Weyer, Frankfurt/Main; Volker Hitzel, Lorsbach/Taunus; Walter Aumüller, Kelkheim/Taunus; Ruth Heerdt, Mannheim, all of Germany

[73] Assignee: Farbwerke Hoechst Aktiengesellschaft vormals Meister Lucius & Bruning, Frankfurt/Main, Germany

[22] Filed: June 20, 1973

[21] Appl. No.: 371,663

[30] Foreign Application Priority Data
June 22, 1972 Germany............................ 2230543

[52] U.S. Cl......... 260/553 DA, 260/556 B, 424/322
[51] Int. Cl.......................................... C07c 127/12
[58] Field of Search ............................. 260/553 DA

[56] References Cited
UNITED STATES PATENTS
3,426,067  2/1969  Weber et al. ............... 260/553 DA

*Primary Examiner*—Leon Zitver
*Assistant Examiner*—Gerald A. Schwartz
*Attorney, Agent, or Firm*—Curtis, Morris & Safford

[57] ABSTRACT

Sulfonyl-ureas of the formula

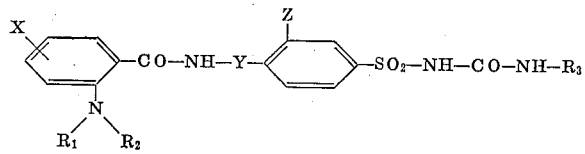

in which
X represents hydrogen, chlorine, bromine, methoxy or methyl, Y represents —CH($CH_3$)—$CH_2$—, —$CH_2$—CH($CH_3$)—or preferably —$CH_2$—$CH_2$—, Z represents hydrogen or together with Y and the phenylene radical the radical

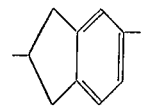

$R_1$ represents hydrogen, lower molecular alkyl, acyl, phenyl, $R_2$ is hydrogen, lower molecular alkyl, $R_3$ is alkyl having 3 to 6 carbon atoms, cycloalkyl, alkylcycloalkyl, cycloalkylalkyl, cycloalkenyl, alkylcycloalkenyl having each 5 to 9 carbon atoms, cyclohexenylmethyl, chlorocyclohexyl, bicycloheptenylmethyl, bicycloheptylmethyl, bicycloheptenyl, bicycloheptyl, nortricyclyl, adamantyl, benzyl, phenylethyl, which as substance or in the form of their salts have pypoglycemic properties and which are distinguished by a strong and continuous lowering of the blood sugar level; processes for preparing them as well as pharmaceutical preparations containing the sulfonyl-ureas as an active substance.

6 Claims, No Drawings

BENZENESULFONYL-UREAS AND PROCESS FOR THEIR PREPARATION

The present invention relates to sulfonyl-ureas of the formula

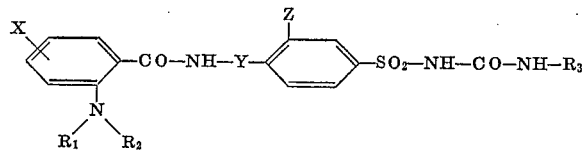

which as substance or in form of the salts thereof have hypoglycemic properties and are distinguished by a strong and continuous lowering of the blood sugar level.

In the formula X represents hydrogen, chlorine, bromine, methoxy or methyl, Y is $-CH(CH_3)-CH_2-$, $-CH_2-CH(CH_3)-$ or preferably $-CH_2-CH_2-$, Z represents hydrogen or together with Y and the phenylene radical the radical

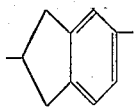

$R_1$ represents hydrogen, lower molecular alkyl, acyl, phenyl, $R_2$ is hydrogen, lower molecular alkyl, $R_3$ is alkyl having 3 to 6 carbon atoms, cycloalkyl, alkycyloalkyl, cycloalkyl-alkyl, cycloalkenyl, alkylcycloalkenyl having each 5 to 9 carbon atoms, cyclohexenylmethyl, chlorocyclohexyl, bicycloheptenylmethyl, bicycloheptylmethyl, bicycloheptenyl, bicycloheptyl, nortricyclyl, adamantyl, benzyl, phenylethyl.

The term "lower molecular alkyl" used in the above meanings defines a straight-chained or branched alkyl having 1 to 4 carbon atoms. "Acyl" is preferably an alkanoyl having 2 to 7 carbon atoms.

The invention further relates to processes for preparing these sulfonyl-ureas. They comprise, if $R_1$ is not identical to hydrogen, a. reacting sulfonyl-carbamic acid esters, sulfonyl-thiolcarbamic acid esters, sulfonyl-ureas, sulfonyl-semicarbazides or -semicarbazones substituted by the group

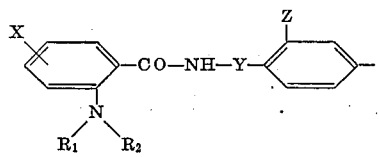

with an amine $R_3-NH_2$ or the salts thereof or reacting sulfon-amides of the formula

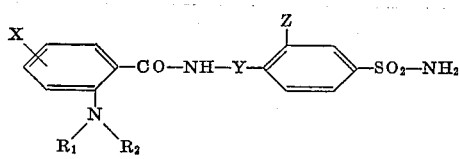

or the salts thereof with $R_3$-substituted isocyanates, carbamic acid esters, thiolcarbamic acid esters, carbamic acid halides or ureas, b. saponifying or hydrolizing correspondingly substituted sulfonyl-isourea ethers, -isothiourea ethers, -parabanic acids or -haloformic acid amines, c. replacing in corresponding sulfonylthio-ureas substituted by the group

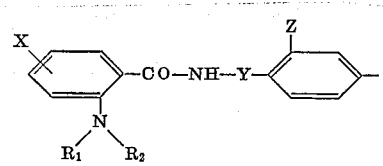

the thiosulfur atom by oxygen, d. adding water onto correspondingly substituted carbodiimides, e. introducing into sulfonyl-ureas of the formula

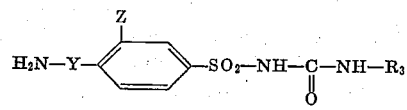

the radical

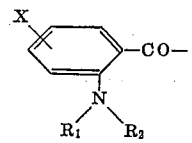

by acylation, if desired, in one or more steps or f. reacting correspondingly substituted sulfonyl-halides with $R_3$-substituted ureas or the alkali salts thereof or reacting correspondingly substituted sulfinic acid halides or, in the presence of an acid condensation agent, correspondingly substituted sulfinic acids or the alkali salts thereof with hydroxy ureas of the formula

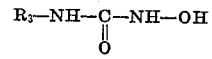

or, if $R_1$ and $R_2$ are identical to hydrogen g. reducing sulfonyl-ureas of the formula

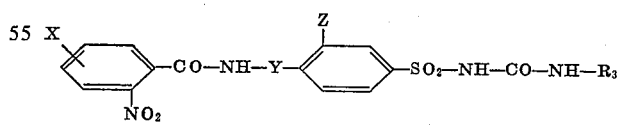

at the nitro group and treating the reaction products, if desired, with alkaline agents for the formation of salts.

If $R_1$ and $R_2$ represent hydrogen the sulfonyl-ureas are obtained by reduction of the nitro compounds, whereby the nitro compounds themselves can be prepared according to the above processes. The benzenesulfonyl-carbamic acid esters or benzenesulfonyl-thiolcarbamic acid esters may contain in the alcohol component an alkyl radical or an aryl radical or a heterocyclic radical. Since this radical is split off during the reaction the chemical constitution thereof has no influence on the nature of the final product and may, thus, be varied within wide limits. The same applies to N—$R_3$-substituted carbamic acid esters or to the corresponding thiolcarbamic acid esters.

As carbamic acid halides the chlorides are preferably used.

The sulfonyl-urea used as starting materials of the process can be unsubstituted, mono- or especially di-substituted at the side of the urea molecule opposite to the sulfonyl group. Since these substituents are split off in the reaction with amines, their nature may be varied within wide limits. In addition to alkyl, acyl, aryl or heterocylically substituted benzenesulfonyl-ureas there may also be used sulfonyl-carbamoyl-imidazoles and similar compounds or bisbenzenesulfonyl-ureas which may carry on one of the nitrogen atoms one further substituent, for example methyl. Those bis-(benzenesulfonyl)-ureas may be treated for example with $R_3$ - substituted amines and the salts obtained heated to elevated temperatures, especially to a temperature about 100°C.

Furthermore it is possible to start from $R_3$-substituted ureas or from those $R_3$-substituted ureas which are mono- or especially di-substituted at the free nitrogen atom, in order to react these ureas with sulfonamides carrying the substituent

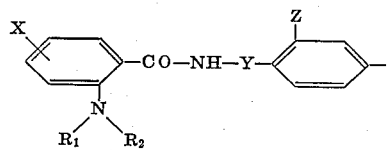

As such starting materials may be used for example N-cyclohexyl-urea, the corresponding N'-acetyl, N'-nitro, N'-cyclohexyl, N',N'-diphenyl-ureas (whereby both phenyl radicals may also be substituted or linked to each other either directly or by means of a bridge member such as —$CH_2$—, —NH—, —O— or —S—), N'-methyl-N'-phenyl-, N',N'-dicyclohexyl ureas as well as cyclohexyl-carbamoyl-imidazoles, -pyrazoles or -triazoles as well as those of the compounds mentioned which carry instead of the cyclohexyl another substituent having one of the definitions given for $R_3$.

The hydrolysis of the sulfonyl-parabanic acids, sulfonyl-isourea ethers, sulfonyl-isothiourea ethers or sulfonyl-haloformic acid amidine mentioned as starting substances is suitably carried out in an alkaline medium. Isourea ethers may also be hydrolized successfully in an acid medium.

The replacement of the sulfur atom in the urea group of correspondingly substituted sulfonylthio-ureas by an oxygen atom can be effected, for example, with the aid of oxides or salts of heavy metals or with the use of an oxidizing agent such, for example, as hydrogen peroxide, sodium peroxide, nitrous acid permanganates.

The thioureas may also be desulfurized by treatment with phosgene or with phosphorus pentachloride. Chloroformic acid amidines or carbodiimides obtained as an intermediate stage may be converted into the sulfonyl ureas by suitable measures, for example, by saponification or addition of water.

With regard to some oxydating agents, for example hydrogen peroxide, the isothiourea ethers have the same behaviour as the corresponding thioureas. Therefore, those ethers can be used like the ureas as starting substances for oxydative desulfurization.

The methods described concern sulfonyl-ureas wherein $R_1$ and $R_2$ are not identical to hydrogen. If $R_1$ and $R_2$ represent hydrogen the compounds are obtained in usual manner by the reduction of nitro compounds.

As regards the reaction conditions the variations of carrying out the process of the invention may, in general, be modified within wide limits and adapted to each individual case. For example, the reactions may be carried out with the use of solvents or without solvents, at room temperature or at an elevated temperature.

Depending on the nature of the starting substances, one or other of the variations of the process hereinbefore described may, in some cases, provide a desired, individual sulfonyl-urea only in a small yield or may be inappropriate for its synthesis. In such comparatively rare cases the expert will have no difficulty in synthesizing the desired produce according to one of the other methods of the process described.

The hypoglycemic action of the benzenesulfonylureas described can be ascertained by administering them as free compounds or in the form of the sodium salts, to normally fed rabbits, in doses of 10 mg/kg of body weight and determining the blood sugar level according to the known method of Hagedorn-Jensen or by means of an autoanalyser for a prolonged period of time.

TABLE

Lowering of the blood sugar in rabbits in % after administration of 10/kg of N-[4-($\beta$-<2-dimethylaminobenzamido>-ethyl)- benzenesulfonyl]-N'-(4-methylcyclohexyl)-urea (compound 1) and N-[4-($\beta$-<2-anilino-5chloro-benzamido>-ethyl)-benzenesulfonyl]-N'-cyclohexylurea (compound 2) orally after . . . hours.

| Hours | 1 | 3 | 6 | 24 | 33 | 48 | 72 |
| --- | --- | --- | --- | --- | --- | --- | --- |
| Compound 1 | −27 | −35 | −35 | −31 | −23 | 0 | 0 |
| Compound 2 | −20 | −21 | −20 | −23 | — | −16 | 0 |

The benzenesulfonyl-ureas described are preferably used for the preparation of pharmaceutical preparations suitable for oral administration and for the lowering of the blood sugar level in the treatment of diabetes mellitus and may be used as such or in the form of their salts or in the presence of substances which cause such salt formation. For the formation of salts, there may be used, pharmaceutically acceptable bases for example, bases such as alkali metal or alkaline earth metal hydroxides or alkali metal or alkaline earth metal carbonates or bicarbonates.

The pharmaceutical preparations are advantageously in the form of tablets which contain in addition to the products of the invention the pharmaceutically suitable carriers such as talc, starch, lactose, tragacanth or magnesium stearate.

A pharmaceutical preparation containing the sulfonyl-ureas described as the active substance, for example, a tablet or a powder with or without carriers, is advantageously brought into a suitable unit dosage form. The dose chosen should comply with the activity of the sulfonyl-urea used and with the desired effect. Advantageously, the dosage per unit amounts to about 0.5 to 100 mg, preferably 2 to 10 mg, but higher or lower dosage units may also be used, which, if desired, are divided or multiplied prior to their administration.

The sulfonyl-ureas of the invention may be used either individually for the treatment of diabetes mellitus or combined with othe oral antidiabetics. Such preparations are not only hypoglycemic sulfonyl-ureas, but also compounds having different chemical compositions such, for example, as biguanides, especially the phenylethyl-biguanide or the dimethyl-biguanide.

The following examples illustrate some of the numerous variations of the process which may be used for the synthesis of the sulfonyl-ureas of the invention, without limiting the object of the invention.

EXAMPLE 1

N-[4-($\beta$-2-amino-benzamidoethyl)-benzenesulfonyl]-N'-cyclohexyl-urea 17.4 Grams of 4-($\beta$-2-nitrobenzamidoethyl)-benzenesulfonamide (melting point 202° to 204°C prepared from 2-nitrobenzoyl chloride and 4-($\beta$-aminoethyl)-benzenesulfonamide) were mixed in 200 ml of acetone with the solution of 2 g of NaOH in water. 6.5 Grams of cyclohexylisocyanate were added to this mixture while stirring, being cooled occasionally; stirring was continued for 2 hours at room temperature; after addition of water and hydrochloric acid the mixture was suction-filtered. The reaction product was recrystallized from diluted ethanol and melted at 208° to 210°C.

15 Grams of N-[4-($\beta$-2-nitrobenzamidoethyl)-benzenesulfonyl]-N'cyclohexyl-urea were hydrogenated in 500 ml of methanol in the presence of Raney-Nickel at room temperature and under normal pressure. After finishing the absorption of hydrogen the catalyst was suction-filtered, the solvent was evaporated under reduced pressure and the residue was recrystallized from diluted ethanol. The N-[4-($\beta$-2-amino-benzamidoethyl)-benzenesulfonyl]-N'-cyclohexyl-urea obtained melted at 160° to 162°C In analogous manner was obtained from the N-[4-($\beta$-2-nitrobenzamidoethyl)-benzenesulfonyl]-N'-(4-ethyl-cyclohexyl)-urea (melting point 189°-191°C) the N-[4-($\beta$-2-aminobenzamidoethyl)-benzenesulfonyl]-N'-(4-ethyl-cyclohexyl)-urea having a melting point of 133°-135°C (from diluted ethanol).

In analogous manner was obtained from the N-[4-($\beta$-<4-methyl-2-nitrobenzamido>-ethyl)-benzenesulfonyl]-N'-cyclohexyl-urea having a melting point of 208°-210°C, the N-[4-($\beta$-<4-methyl-2-aminobenzamido>-ethyl)-benzenesulfonyl]-N'-cyclohexyl-urea having a melting point of 184°-186°C (from ethanol), by means of the N-[4-($\beta$-<4-methyl-2-nitrobenzamido>-ethyl)-benzenesulfonyl[-N'-(4-methylcyclohexyl)-urea having a melting point of 185°C to 187°C the N-[4-($\beta$-<4-methyl-2-aminobenzamido>-ethyl)-benzenesulfonyl]-N'-(4-methylcyclohexyl)-urea having a melting point of 172°-174°C (from ethanol).

In analogous manner was obtained by means of the N-[4-($\beta$-<3-methyl-2-nitro-benzamido>-ethyl)-benzene-sulfonyl]-N'-cyclohexyl-urea having a melting point of 200°-202°C the N-[4-($\beta$-<3-methyl-2-amino-benzamido>-ethyl)-benzene-sulfonyl]-N'-cyclohexyl-urea having a melting point of 196°-198°C by means of the N-[4-($\beta$-5-chloro-2-nitro-benzamidoethyl)-benzenesulfonyl]-N'-cyclohexyl-urea having a melting point of 195°-196°C the N-[4-($\beta$-5-chloro-2-amino-benzamidoethyl)-benzene-sulfonyl]-N'-cyclohexyl-urea having a melting point of 171°-173°C (from ethanol) by means of the N-[4-($\beta$-5-chloro-2-nitro-benzamidoethyl)-benzene-sulfonyl]-N'-4-methylcyclohexyl-urea having a melting point of 191°-192°C the N-[4-($\beta$-5-chloro-2-aminobenzamidoethyl)-benzene-sulfonyl]-N'-4-methylcyclohexyl-urea having a melting point of 159°-161°C (from ethanol) by means of the N-[4-($\beta$-5-chloro-2-nitro-benzamidoethyl)-benzene-sulfonyl]-N'-4-ethylcyclohexyl-urea having a melting point of 201°-203°C the N-[4-($\beta$-5-chloro-2-amino-benzamidoethyl)-benzene-sulfonyl]-N'-4-ethylcy-clohexyl-urea having a melting point of 152°-154°C (from ethanol) and by means of the N-[4-($\beta$-<3-methyl-2-nitro-benzamido>-ethyl)-benzene-sulfonyl]-N'-4-methyl-cyclohexyl-urea having a melting point of 209°-211°C the N-[4-($\beta$-<3-methyl-2-amino-benzamido>-ethyl)-benzenesulfonyl]-N'-4-methyl-cyclohexyl-urea having a melting point of 173°-175°C.

EXAMPLE 2

N-[4-($\beta$-2-acetamidobenzamidoethyl)-benzenesulfonyl]-N'-cyclohexyl-urea 14.1 Grams of 4-($\beta$-4-acetamidobenzamidoethyl)-benzenesulfonamide (melting point 213°-215°C, prepared by reduction of 4-($\beta$-2-nitrobenzamidoethyl)-benzenesulfonamide with hydrogen in the presence of Raney Nickel and acetylation of the amino compound) were mixed in 200 ml of acetone with 1.5 g of NaOH in water and reacted, while cooling occasionally, with 5.1 g of cyclohexylisocyanate. Stirring was continued for 2 hours at room temperature, the mixture was mixed with water, acidified, suction-filtered, the ammonia was precipitated and recrystallized from diluted ethanol. The N-[4-($\beta$-2-acetamidobenzamidoethyl)-benzenesulfonyl]-N'-cyclohexyl-urea obtained melted at 176°-178°C.

In analogous manner was obtained the

N-[4-($\beta$-2-acetamidobenzamidoethyl)-benzenesulfonyl]-N'-(4-methyl-cyclohexyl)-urea having a melting point of 192°-194°C (from diluted ethanol).

In analogous manner was obtained by means of the 4-($\beta$-2-isobutyramidobenzamidoethyl)-benzenesulfonamide (melting point 194°-196°C, prepared from 4-($\beta$-2-aminobenzamidoethyl)-benzenesulfonamide and isobutyric acid chloride) the N-[4-($\beta$-2-isobutyramidobenzamidoethyl)-benzenesulfonyl]-N'-cyclohexyl-urea having a melting point of 128°–130°C (from diluted ethanol), the N-[4-(β-2-isobutyramidobenzamidoethyl)-benzenesulfonyl]-N'-(4-methylcyclohexyl)-urea having a melting point of 184°–186°C (from diluted ethanol).

In analogous manner was obtained from the 4-(β-2-capronamidobenzamidoethyl)-benzenesulfonamide (melting point 181°–183°C, prepared from 4-(β-2-aminobenzamidoethyl)-benzenesulfonamide and caproic acid chloride)

the N-[4-(β-2-capronamidobenzamidoethyl)-benzenesulfonyl]-N'-cyclohexyl-urea having a melting point of 153°–155°C (from diluted ethanol), the N-[4-(β-2-capronamidobenzamidoethyl)-benzenesulfonyl]-N'-(4-methylcyclohexyl)-urea having a melting point of 178°–180°C (from diluted methanol).

In analogous manner was obtained from the 4-(β-2-<N-methylacetamido>-benzamidoethyl)-benzenesulfonamide (melting point 218°–220°C, prepared from 4-(β-2-methylaminobenzamidoethyl)-benzenesulfonamide and acetic acid anhydride) the N-[4-(β-2-<N-methylacetamido>-benzamidoethyl)-benzenesulfonyl]-N'-(4-methylcyclohexyl)-urea having a melting point of 160°–163°C (from diluted ethanol).

In analogous manner was obtained from the 4-(β-2-anilinobenzamidoethyl)-benzenesulfonamide (melting point 193°–195°C, prepared from the mixed anhydride of the diphenylamino-2-carboxylic acid and 4-(β-aminoethyl)-benzenesulfonamide)

the N-[4-(β-2-anilinobenzamidoethyl)-benzenesulfonyl]-N'-cyclohexyl-urea having a melting point of 175°–177°C (from ethanol/DMF), the N-[4-(β-2-anilinobenzamidoethyl)-benzenesulfonyl]-N'-(4-methylcyclohexyl)-urea having a melting point of 196°–198°C (from ethanol/DMF).

In analogous manner was obtained from the 4-(β-<2-aniline-5-chloro-benzamido>-ethyl)-benzenesulfonamide (melting point 191°–193°C, prepared from the mixed anhydride of the 4-chloro-diphenylamino-2-carboxylic acid and 4-(β-aminoethyl)-benzenesulfonamide)

the N-[4-(β-<2-anilino-5-chloro-benzamido>-ethyl)-benzenesulfonyl]-N'-cyclohexylurea having a melting point of 185°–187°C (from methanol/water), from the 4-(β-<2-anilino-5-methoxy-benzamido>-ethyl)-benzenesulfonamide (melting point 138°–140°C, prepared from the mixed anhydride of the 4-methoxy-diphenylamino-2-carboxylic acid and 4-(β-aminoethyl)-benzenesulfonamide)

the N-[4-(β-<2-anilino-5-methoxy-benzamido>-ethyl)-benzenesulfonyl]-N'-cyclohexyl-urea having a melting point of 160°–161°C (from ethanol/water) and the N-[4-(β-<2-anilino-5-methoxy-benzamido>-ethyl)-benzenesulfonyl]-N'-(4-methylcyclohexyl)-urea having a melting point of 138°–140°C (from methanol/dioxane/water).

EXAMPLE 3

N-[4-(β-<2-acetamido-5-chloro-benzamido>-ethyl)-benzenesulfonyl]-N'-cyclohexyl-urea 21.3 Grams of 2-acetamido-5-chloro-benzoic acid were mixed in 400 ml of tetrahydrofurane with 30.0 g of triethyl amine. While cooling with ice and stirring 11.4 g of chloroformic acid methyl ester were added dropwise to this mixture and stirring was continued for 30 minutes. 24.8 Grams of 4-(β-aminoethyl)-benzenesulfonamide hydrochloride were added portion wise to this suspension and stirring was continued for 4 hours at room temperature. After removing the solvent under reduced pressure the residue was taken up in diluted sodium hydroxide solution, filtered with the addition of coal and acidified with diluted hydrochloric acid. The deposit formed was reprecipitated again. The 4-(β-<2-acetamido-5-chloro-benzamido>-ethyl)-benzenesulfonamide thus obtained was recrystallized from ethanol-dioxane-water and melted at 242°–244°C.

12.5 Grams of 4-(β-<2-acetamido-5-chloro-benzamido>-ethyl)-benzenesulfonamide were refluxed in 100 ml of dioxane and 100 ml of acetone together with 8.85 g of potassium carbonate (ground) for 2 hours, while stirring. After adding dropwise 3.9 g of cyclohexylisocyanate stirring was continued for another seven hours under reflux, the deposit formed was suction-filtered, dissolved in water, filtered with coal and acidified with diluted hydrochloric acid. Having suction-filtered the N-[4-(β-<2-acetamido-5-chloro-benzamido>-ethyl)-benzenesulfonyl]-N'-cyclohexyl-urea was recrystallized from methanol/water and melted at 196°–197°C.

In analogous manner were obtained the N-[4-(β-<2-acetamido-5-chloro-benzamido>-ethyl)-benzenesulfonyl]-N'-(4-methyl-cyclohexyl)-urea having a melting point of 184°–186°C (from methanol-dioxane-water)

N-[4-(β-<2-acetamido-5-chloro-benzamido>-ethyl)-benzenesulfonyl]-N'-butyl-urea having a melting point of 204°–206°C (from nitromethane).

EXAMPLE 4

N-[4-β-<2-dimethylaminobenzamido>-ethyl)-benzenesulfonyl]-N'-cyclohexyl-urea 16.6 Grams of 2-dimethylamino-benzoic acid were dissolved together with 30 g of triethylamine in 400 ml of tetrahydrofurane. While cooling with ice, 11.8 g of chloroformic acid methyl ester were added dropwise, stirring was continued for 30 minutes while cooling and subsequently 24.8 g of 4-(β-amino-ethyl)-benzenesulfonamide hydrochloride were introduced in small amounts. After a reaction time of 4 hours the solvent was evaporated under reduced pressure, the residue was taken up in diluted sodium hydroxide solution, filtered with coal and acidified with acetic acid. The deposit obtained of the 4-(β-<2-dimethylamino-benzamido>-ethyl)-benzenesulfonamide became gradually crystalline and melted at 153°–154°C after recrystallization from diluted methanol.

7.3 Grams of 4-(β-<2-dimethylamino-benzamido>-ethyl)-benzenesulfonamide were dissolved in 10 ml of 2N-sodium hydroxide solution and 75 ml of acetone and while cooling with ice, 2.75 g of cyclohexylisocyanate were added dropwise. Stirring was continued for 3 hours at room temperature, the deposit precipitated was dissolved with water, filtered and acidified with 2N-acetic acid. The N-[4-(β-<2-dimethylaminobenzamido>-ethyl)-benzenesulfonyl]-N'-cyclohexyl-urea precipitated was suction-filtered, recrystallized from methanol-dioxane-water and melted at 212°–213°C.

In analogous manner were obtained the N-[4-(β-<2-dimethylaminobenzamido>-ethyl)-benzenesulfonyl]-N'-(4-methylcyclohexyl)-urea having a melting point of 192°–193°C (from methanol-dioxane-water)

N-[4-(β-<2-dimethylaminobenzamido>-ethyl)-benzenesulfonyl]-N'-butyl-urea having a melting point of 165°–166°C (from methanol-dioxane-water)

N-[4-(β-<2-dimethylaminobenzamido>-ethyl)-benzenesulfonyl]-N'-Δ3-cyclohexenyl-urea having a melting point of 207°–208°C (from methanol/dioxane)

N-[4-(β-<2-dimethylaminobenzamido>-ethyl)-benzenesulfonyl]-N'-cycloheptyl-urea having a melting point of 184°–185°C (from methanol)

N-[4-(β-<2-dimethylaminobenzamido>-ethyl)-benzenesulfonyl]-N'-(4-ethylcyclohexyl)-urea having a melting point of 208°–210°C (from methanol/water)

N-[4-(β-<2-dimethylaminobenzamido>-ethyl)-benzenesulfonyl]-N'-(2.5-endoethylene-cyclohexyl)-urea having a melting point of 199°–201°C (from methanol).

N-[4-(β-<2-dimethylaminobenzamido>-ethyl)-benzenesulfonyl]-N'-(4,4-dimethylcyclohexyl)-urea having a melting point of 195°–197°C (from methanol/water)

N-[4-(β-<dimethylaminobenzamido>-ethyl)-benzenesulfonyl]-N'-isobutyl-urea having a melting point of 172°–173°C (from methanol/water)

N-[4-(β-<2-dimethylaminobenzamido>-ethyl)-benzenesulfonyl]-N'-cyclopentyl-urea having a melting point of 195°–196°C (from methanol)

N-[4-(β-<2-dimethylaminobenzamido>-ethyl)-benzenesulfonyl]-N'-cyclopentylmethyl-urea having a melting point of 173°–174°C (from methanol)

N-[4-(β-<2-dimethylaminobenzamido>-ethyl)-benzenesulfonyl]-N'-β-phenylethyl-urea having a melting point of 182°–183°C (from methanol)

N-[4-(β-<2-dimethylaminobenzamido>-ethyl)-benzenesulfonyl]-N'-benzyl-urea having a melting point of 161°–163°C (from methanol)

EXAMPLE 5

N-[4-(β-<2-methylaminobenzamido>-ethyl)-benzenesulfonyl]-N'-cyclohexyl-urea 17.7 Grams of N-methyl-isatoic acid anhydride(1-methyl-2H-3,1-benzoxazin-2,4(1H)-dione) were suspended in 50 ml of absolute dimethyl formamide and the solution was heated to 45°C. While stirring a solution of 20.2 g of 4-(β-aminoethyl)-benzenesulfonamide in 150 ml of DMF was added dropwise within one hour. Then stirring was continued for 4 hours at 40°–50°C. The clear solution formed was poured into about 500 ml of water, the 4-(β-<2-methylaminobenzamido>-ethyl)-benzenesulfonamide was suction-filtered and, after treating with a sodium bicarbonate solution and drying, recrystallized from methanol. The melting point was 141°–142°C.

6.6 Grams of the sulfonamide thus obtained were dissolved in a mixture of 75 ml of acetone and 10 ml of a 2N sodium hydroxide solution and after cooling with ice, mixed dropwise while stirring with 2.75 g of cyclohexylisocyanate. Having continued stirring for 3 hours at room temperature the deposit formed was dissolved with water, filtered and acidified with 2N acetic acid. The N-[4-(β-<2-methylaminobenzamido>-ethyl)-benzenesulfonyl]-N'-cyclohexyl-urea was suction filtered and recrystallized from methanol/water. It melted at 175°–177°C.

In analogous manner were obtained:

N-[4-(β-<2-methylaminobenzamido>-ethyl)-benzenesulfonyl]-N'-butyl-urea having a melting point of 155°–156°C (from methanol/water).

N-[4-(β-<2-methylaminobenzamido>-ethyl)-benzenesulfonyl]-N'-(4-methylcyclohexyl)-urea having a melting point of 171°–173°C (from methanol/water)

N-[4-(β-<2-methylaminobenzamido>-ethyl)-benzenesulfonyl]-N'-cycloheptyl-urea having a melting point of 169°–170°C (from methanol)

In analogous manner was obtained from 4-(β-<5-chloro-2-methylaminobenzamido>-ethyl)-benzenesulfonamide (melting point 128°–130°C, prepared from 5-chloro-N-methyl-isatoic acid anhydride and 4-(β-aminoethyl)-benzenesulfnamide, recrystallized from methanol-dioxane-water the N-[4-(β-<5-chloro-2-methylaminobenzamido>-ethyl)-benzenesulfonyl]-N'-cyclohexyl-urea having a melting point of 196° to 197°C (from methanol-dioxane-water).

In analogous manner were obtained from the 4-(β-<2-ethylaminobenzamido>-ethyl)-benzenesulfonamide (melting point 183°C, prepared from N-ethyl-isatoic acid anhydride and 4-(β-aminoethyl)-benzenesulfonamide, recrystallized from methanol/water)

the N-[4-(β-<2-ethylaminobenzamido>-ethyl)-benzenesulfonyl]-N'-cyclohexyl-urea having a melting point of 161°–162°C (from methanol-dioxane-water)

N-[4-(β-<2-ethylaminobenzamido>-ethyl)-benzenesulfonyl]-N'-butyl-urea having a melting point of 149°–150°C (from methanol-dioxane-water).

N-[4-(β-<2-methylaminobenzamido>-ethyl)-benzenesulfonyl]-N'-(4-methylcyclohexyl)-urea having a melting point of 188°–190°C (from methanol-dioxane-water)

In analogous manner were obtained from the 4-(β-<2-ethyl-amino-5-chloro-benzamido>-ethyl)-benzenesulfonamide (melting point of 163°–164°C, prepared from N-ethyl-5-chloro-isatoic acid anhydride (melting point of 142°–144°C, from ethanol) and 4-(β-aminoethyl)-benzenesulfonamide, recrystallized from methanol-dioxane-water)

the N-[4-(β-<2-ethylamino-5-chloro-benzamido>-ethyl)-benzenesulfonyl]-N'-cyclohexyl-urea having a melting point of 186°C to 188°C (from ethanol)

N-[4-(β-<2-ethylamino-5-chloro-benzamido>-ethyl)-benzenesulfonyl]-N'-butyl-urea having a melting point of 138°–140°C (from methanol/water)

N-[4-(β-<2-ethylamino-5-chloro-benzamido>-ethyl)-benzenesulfonyl]-N'-(4-methylcyclohexyl)-urea having a melting point of 174°–176°C (from methanol-dioxane-water)

In analogous manner were obtained from the 4-(β-<2-vutylaminobenzamido>-ethyl)-benzenesulfonamide (melting point of 152°–153°C, prepared from N-butyl-isatoic acid anhydride and 4-(β-2-aminoethyl)-benzenesulfonamide, recrystallized from methanol/water)

the N-[4-(β-<2-butylaminobenzamido>-ethyl)-benzenesulfonyl]-N'-cyclohexyl-urea having a melting point of 159°–160°C (from methanol-dioxane-water)

N-[4-(β-<2-butylaminobenzamido>-ethyl)-benzenesulfonyl]-N'-butyl-urea having a melting point of 156°–157°C (from methanol/water)

N-[4-(β-<2-butylaminobenzamido>-ethyl)-benzenesulfonyl]-N'-(4-methylcyclohexyl)-urea having a melting point of 169°–170°C (from methanol/water)

In analogous manner were obtained from the 4-(β-<5-bromo-2-butylamino-benzamido>-ethyl)-benzenesulfonamide (melting point 150°–151°C, prepared from N-butyl-5-bromo-isatoic acid anhydride (melting point of 132°–134°C from ethanol) and 4-(β-aminoethyl)-benzenesulfonamide, recrystallized from methanol/water)

the N-[4-(β-<5-bromo-2-butylamino-benzamido>-ethyl)-benzenesulfonyl]-N'-cyclohexyl-urea having a melting point of 164°–166°C (from methanol-dioxane-water)

N-[4-(β-<5-bromo-2-butylamino-benzamido>-ethyl)-benzenesulfonyl]-N'-butyl-urea having a melting point of 151°–153°C (from ethanol)

N-[4-(β-<5-bromo-2-butylamino-benzamido>-ethyl)-benzenesulfonyl]-N'-(4-methylcyclohexyl)-urea having a melting point of 169°–170°C (from ethanol)

In analogous manner was obtained from the (2-ethylaminobenzamido)-indane-5-sulfonamide (melting point of 211°–212°C, prepared from N-ethyl-isatoic acid anhydride and 1-amino-indane-5-sulfonamide, recrystallized from nitromethane) the N-[2-(2-ethylaminobenzamido)-indane-5-sulfonyl]-N'-cyclohexyl-urea having a melting point of 186°–188°C (from ethanol/water)

EXAMPLE 6

N-[4-(β-<2-methylaminobenzamido>-ethyl)-benzenesulfonyl]-N'-cyclohexyl-urea 8.85 Grams of N-methyl-isatoic acid anhydride were suspended in 50 ml of absolute DMF and heated to 50°C. While stirring, a suspension of 16.3 g of N-[4-(β-aminoethyl)-benzenesulfonyl]-N'-cyclohexyl-urea in 50 ml of DMF was added portionwise. Stirring was continued for 4 hours and the mixture was allowed to stand over night. When diluting with 1 liter of water a precipitate was obtained which was suction-filtered and treated with a sodium bicarbonate solution. The remaining product was reprecipitated from diluted ammonia solution with acetic acid. After recrystallization from methanol/water the N-[4-(β-<2-methylaminobenzamido>-ethyl)-benzenesulfonyl]-N'-cyclohexyl-urea melted at 174°–176°C.

EXAMPLE 7

N-[4-(β-<2-dimethylamino-benzamido>-ethyl)-benzenesulfonyl]-N'-cyclohexyl-urea 4.9 Grams of N-[4-(β-<2-dimethylamino-benzamido>-ethyl)-benzenesulfonyl]-N'-cyclohexylthio-urea (melting point of 147°–148°C, prepared by reaction of 4-(β-<2-dimethylaminobenzamido>-ethyl)-benzenesulfonamide with cyclohexyl isothio-cyanate) were dissolved in 250 ml of methanol, mixed with 2.1 g of yellow mercury oxide and spatula point of potassium carbonate and refluxed for 4 hours while stirring. The mercury sulfide was filtered off and the solution was evaporated under reduced pressure. The N-[4-(β-<2-dimethylaminobenzamido>-ethyl)-benzenesulfonyl]-N'-cyclohexyl-isourea methyl ether remained as an oily liquid which could not be crystallized and, therefore, was further treated as a crude product.

The oily crude product was dissolved in a small amount of dioxane and heated with 25 ml of 2N-sodium hydroxide solution on the steam bath. After cooling the mixture was acidified with 2N acetic acid and suction-filtered. After recrystallizing from methanol-dioxane-water the N-[4-(β-<2-dimethylaminobenzamido>-ethyl)-benzenesulfonyl]-N'-cyclohexyl-urea melted at 212°–213°C.

EXAMPLE 8

N-[4-(β-<2-dimethylaminobenzamido>-ethyl)-benzenesulfonyl]-N'-bicyclo(2,2,1)-hept-2-yl-methyl-urea 7.3 Grams of 4-(β-<2-dimethylamino-benzamido>-ethyl)-benzene-sulfonamide were dissolved in 20 ml of 2N-sodium hydroxide solution and 75 ml of acetone, cooled to 0°C and mixed dropwise with 2.17 g of chloroformic acid methyl ester. The mixture was heated to room temperature and stirring was continued for 2 hours. Subsequently the solvent was evaporated under reduced pressure, the residue was taken up in a diluted ammonia solution, filtered from the undissolved material and acidified with diluted acetic acid. The 4-(β-<2-dimethylaminobenzamido>-ethyl)-benzenesulfonyl-carbamic acid methyl ester precipitated was suction-filtered and recrystallized from water and a small amount of methanol; it melted at 145°C to 147°C.

4.0 Grams of 4-(β-<2-dimethylaminobanzamido>-ethyl)-benzenesulfonyl-carbamic acid methyl ester were refluxed in 70 ml of dioxane with 1.3 g of bicyclo-(2,2,1)-hept-2-yl-methylamine for two hours while stirring. After cooling the mixture was diluted with water and the product was crystallized. After suction-filtering and recrystallizing from methanol the N-[4-(β-<2-dimethylaminobenzamido>-ethyl)-benzenesulfonyl]-N'-bicyclo(2,2,1)-hept-2-yl-methyl-urea melted at 156°–158°C.

In analogous manner were obtained:

The N-[4-(β-<2-dimethylaminobenzamido>-ethyl)-benzenesulfonyl]-N'-4-chlorocyclohexyl-urea having a melting point of 158°–160°C (from methanol/water) and the N-[4-(β-<2-dimethylaminobenzamido>-ethyl)-benzenesulfonyl]-N'-Δ³-cyclohexeneylmethyl-urea having a melting point of 160°–161°C (from methanol).

What is claimed is:
1. A sulfonyl-urea of the formula

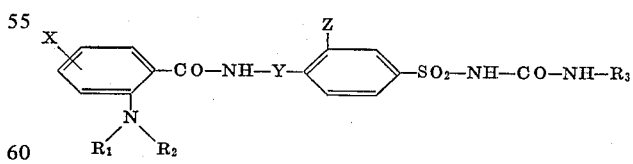

in which
X represents hydrogen, chlorine, bromine, methoxy or methyl, Y represents —CH(CH₃)—CH₂—, —CH₂—CH(CH₃)— or —CH₂—CH₂—, Z represents hydrogen or together with Y and the phenylene radical the radical

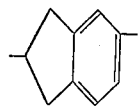

$R_1$ represents hydrogen, lower alkyl, phenyl, $R_2$ is hydrogen, lower alkyl, $R_3$ is alkyl having 3 to 6 carbon atoms, cycloalkyl, alkylcycloalkyl, cycloalkylalkyl, cycloalkenyl, alkylcycloalkenyl having each 5 to 9 carbon atoms, cyclohexenylmethyl, chlorocyclohexyl, bicycloheptenylmethyl, bicycloheptylmethyl, bicycloheptenyl, bicycloheptyl, nortricyclyl, adamantyl, benzyl and phenylethyl, or a salt thereof of a pharmaceutically acceptable base.

2. A compound as claimed in claim 1, wherein $R_1$ and $R_2$ represent methyl, $R_3$ represents 4-methylcyclohexyl, X and Z represent hydrogen and Y the group —CH$_2$—CH$_2$.

3. A compound as claimed in claim 1, wherein $R_1$ represents phenyl, $R_2$ and Z represent hydrogen, $R_3$ is cyclohexyl, X is chlorine in 5-position to the carbomamide group and Y is the group —CH$_2$—CH$_2$.

4. A compound as claimed in claim 1, wherein $R_1$ or $R_2$ represent methyl, $R_1$ or $R_2$ hydrogen, $R_3$ is 4-methylcyclohexyl, X and Z represent hydrogen and Y the group —CH$_2$—CH$_2$.

5. A compound as claimed in claim 1, wherein $R_1$ or $R_2$ represent ethyl, $R_1$ or $R_2$ hydrogen, $R_3$ is 4-methylcyclohexyl, X is chlorine in 5-position to the carbonamide group, Y is the —CH$_2$—CH$_2$— group and Z represents hydrogen.

6. A compound as claimed in claim 1, wherein $R_1$ and $R_2$ represent methyl, $R_3$ is cycloheptyl, X and Z represent hydrogen and Y the group —CH$_2$—CH$_2$.

* * * * *